United States Patent Office 2,895,837
Patented July 21, 1959

2,895,837

NEW COMPLEX SOLUTIONS AND DISPERSIONS AND PROCESS FOR THEIR PREPARATION

Xavier Bilger, Soisy/sous-Montmorency, and Paul Muller Chantilly, France, assignors to Compagnie Française des Matieres Colorantes, Paris, France, a French body corporate No Drawing. Application December 26, 1956
Serial No. 630,452

3 Claims. (Cl. 106—18)

The present invention concerns new complex solutions and dispersions and process for their preparation.

The obtaining of organometallic complexes of the Werner type, which are water-soluble and contain chromium and an organic component in the cation, is particularly described in U.S. Patents Nos. 2,273,040, 2,356,161, 2,524,803 and 2,549,220, in French Patents Nos. 1,110,678, 1,110,459, 1,120,111 and 1,130,229 and in the U.S. patent applications Serial Nos. 548,782, of November 23, 1955, now abandoned; 548,765, of November 23, 1955, now abandoned; 558,859, of January 13, 1956.

The complexes so obtained have applications as waterproofing agents, agents for treatment of surfaces, tanning agents, feeding agents, and as dyestuffs and parasiticides. It has now been found that these same complexes have a considerable peptising power with respect to solid or resinous substances which are insoluble, or not very soluble, in water. Thus, on dissolving watersoluble solid or resinous compounds in alcoholic solutions of the said complexes and diluting the solutions so obtained with water, perfectly clear aqueous solutions, or, if the concentration of water-insoluble compound is higher, very stable dispersions, can be obtained. In French Patent 1,103,518 it is mentioned that the chromium complexes of fatty liquors play the part of emulsifying agents with respect to crude oils. It was not possible to conclude from this, however, that the complexes obtained according to the proecsses of the patents or patent applications mentioned in the second paragraph of this specification were capable of being used in a very general manner to disperse solid or resinous substances.

The present invention therefore provides a process for the prepartion of solutions or dispersions in water of solid or resinous substances which are insoluble in water which comprises intimately mixing the latter with water and with water-soluble complexes of the Werner type which contain chromium and an organic component in the cation.

Depending on the proportions of water, water-insoluble substance and complex of the Werner type, clear solutions or pseudo-solutions or more or less opaque dispersions are obtained.

The mixing can be effected, for example, by grinding or kneading, by solution of the complex and the water-insoluble solid or resinous substance in a suitable solvent, preferably a water-soluble solvent, with or without elevation of temperature, then dilution with water of the solution thus obtained, or finally by formation of the insoluble, or not very soluble, solid or resinous substance in aqueous medium and in the presence of the complex. During the preparation of the solutions and dispersions according to the invention, any auxiliary products can be added such as protective colloids, solvents, wetting agents or other dispersing agents.

The water-soluble chromium complexes which are employed in carrying into effect the present process may be derivatives of the following compounds:

(a) Aliphatic or isocyclic, saturated or unsaturated, carboxylic acids, such as fatty acids, resin acids, naphthenic acids, benzoic acid, naphthoic acid, crotonic acid, methacrylic acid, carboxylic acids substituted, for example, by halogen atoms, or by oxo, hydroxy, alkoxy, aryloxy, amino, nitro or nitrile groups, heterocyclic carboxylic acids such as furancarboxylic acid, indolylacetic acid, aliphatic or isocyclic, saturated or unsaturated, polycarboxylic acids such as adipic, sebacic and phthalic acids;

(b) Phenolic compounds of the isocyclic or heterocyclic series not containing —COOH, —SO₃H, —OSO₃H, —PO₃H₂ groups, but containing at least one phenolic —OH group as well as one or more other groups coordinatively unsaturated and non-solubilising; the latter include, for example, the groups —OH, —CO—, —CHO, —O—, —COO—, —CO—N<, —NO, —NO₂, —N<, —N=N—,

—SO₂—, —SO₂—N<, and —SO₂—O—. These phenolic derivatives may also contain other non-solubilising groups such as alkyl, cycloalkyl, aryl aralkyl, alkylaryl or nitrile groups or halogen atoms. (The phenolic compounds are particularly suitable for the realisation of these mixed complexes when the co-ordinatively unsaturated and non-solubilising group is situated in the ortho or peri position with regard to the phenolic —OH group.);

(c) Compounds able to give rise to a transformation of the keto-enol type. These compounds may belong to the aliphatic, isocyclic or heterocyclic series and they may contain, apart from the keto-enol group, other functional groupings with straight or branched chains. The chain or chains may be interrupted by hetero-atoms such as O, N, S, P or Si. Among these compounds may be mentioned, for example, esters and amides of acylacetic acids, beta-diketones, beta-ketone aldehydes, pyrazolones, omega-cyanoketones, sulphazones, beta-oxosulphones, and esters and amides of malonic acid.

The complexes used in this invention contain one of the above-mentioned organic components as well as trivalent chromium in the cation and their anions are constituted by monovalent anions. They may be obtained, in particular, by any of the processes described in the patents and patent applications mentioned in the second paragraph of this specification. The solid or resinous substances which are insoluble, or not very soluble, in water which can be peptised by means of these complexes are, for example, resins, dyestuffs, pigments, fungicides, antiseptics, and parasiticides. The aqueous solutions, pseudo-solutions or dispersions obtained can be used for the most diverse purposes, particularly in those industries dealing with fibrous materials, for example, textiles, paper, leather and synthetic materials.

By means of the solutions or dispersions of the present invention, various effects can be obtained, for example water-proofing, fire-proofing, dressing, colouring or protection against moulds, fungi and other parasites.

In the case where the peptised or dispersed substance is an organometallic salt, it is possible for mixed complexes containing chromium and another metal to be formed during the solution. In the case where the peptised or dispersed substance is an organic substance capable of forming complexes, there may be formed during the solution mixed complexes including trivalent chromium and at least two organic components (the peptised substance itself and that provided by the original complex).

A particularly interesting case is that of the copper salt of 8-hydroxy-quinoline, which dissolves readily in alcoholic solutions of the complexes mentioned in the second paragraph of the specification. The solutions obtained can be diluted with water without precipitation and be employed in order to render fibrous materials at the same time water-proof and resistant to the attacks of micro-organisms. The application of the copper salt of 8-hydroxy-quinoline in this form has the same advantages as its application in the forms described in the patent application filed today and already mentioned.

The following examples, in which the parts given are parts by weight unless the contrary is indicated, illustrate the invention without limiting it.

*Example 1*

A. There is introduced into a reaction apparatus made of enamelled cast iron, 60 parts of isopropyl alcohol, 38 parts of absolute ethyl alcohol and 34 parts of crystallized bichromate. A current of gaseous hydrogen chloride is passed into the mixture, with stirring and at 60–65° C., until 22 parts of this acid have been introduced. 28 parts of stearic acid are added, and the mixture is kept at 60° C. until the product is soluble in water. The mixture is cooled to room temperature, 184 parts of isopropyl alcohol are added and the mixture is filtered.

A stable alcoholic solution of chromium stearato-chloride is obtained. 95 parts of this solution are mixed with 5 parts of copper 8-hydroxy-quinolate. This mixture is refluxed for an hour. The copper 8-hydroxy-quinolate gradually passes into solution and a clear alcoholic solution, green-brown in colour, is finally obtained which is perfectly soluble in water in all proportions.

B. This alcoholic solution is used for water-proofing fibrous materials and for their protection against moulds, for example, in the following manner: 30 parts of the alcoholic solution obtained above is dissolved in 500 parts of water. 100 parts of an aqueous 4% solution of hexamethylenetetramine are then added, and the mixture is made up to 1000 parts with water. A cotton twill fabric is impregnated with this solution for 15 minutes in the cold, and is drained to 100% and dried at 100–110° C. This fabric is completely water-proof and protected against attack by fungi.

*Example 2*

A mixture of 28.4 parts of stearic acid, 37 parts of sodium bichromate, 300 parts of carbon tetrachloride and 34 parts of ethyl alcohol is refluxed, and dry hydrogen chloride bubbled through the mixture. The reaction medium, at first yellow, turns brown and then dark green. The bubbling through of the hydrogen chloride is stopped when the latter is no longer absorbed by the mixture, which is in about 30 minutes (22 parts of hydrogen chloride have been absorbed). The refluxing of carbon tetrachloride is kept up for about a further half hour, then the solvent is evaporated. The resulting mass is taken up in 120 parts of boiling isopropyl alcohol. After cooling, the mixture is filtered to eliminate the sodium chloride and an alcoholic solution of the complex of chromium stearato-chloride is obtained. A mixture made up of 90 parts of this solution and 10 parts of copper 8-hydroxy-quinolate is agitated and heated under reflux for three hours. A clear alcoholic solution, green-brown in colour, is thus obtained, which can be diluted with water in all proportions without precipitation occurring. This alcoholic solution may be employed for water-proofing and as an antiparasitic dressing.

*Example 3*

225 parts of stearic acid are added to 1000 parts of a solution of basic chromium chloride in isopropyl alcohol containing about 14% of chlorine and 10% of chromium, the mixture is heated for half an hour at boiling point, and then 100 parts of an amylphenolformaldehyde resin in solution in 100 parts of isopropyl alcohol are added. The product obtained gives perfectly stable dispersions with water which possess good water-proofing properties. The water-proofing obtained resists repeated washing.

*Example 4*

To the solution of basic chromium chloride employed in Example 3 are added 275 parts of acid phthalate of lauryl alcohol, the mixture is heated for half an hour at ebullition, and then 150 parts of a solution of dimethylol urea resin etherified with butyl alcohol, comprising 60% of resin and 40% of normal butyl alcohol, are added.

The product obtained gives perfectly stable dispersions with water, which possess good water-proofing properties. The water-proofing obtained stands up well to washing.

*Example 5*

To the solution of basic chromium chloride employed in Example 3 are added 1650 parts of a polyester resin corresponding to the following characteristics: 35% of styrene monomer and 65% of resin material of acid value 44 obtained by condensation of one molecule of maleic anhydride, one molecule of phthalic anhydride and two molecules of propylene glycol. The mixture is heated at boiling point for half an hour. The product obtained is completely soluble in water. A further addition of 300 parts of resin gives a colloidal dispersion in water. On increasing the charge, the tendency is gradually towards an even thicker dispersion, and the latter is still very stable with a further addition of 500 parts of resin.

*Example 6*

200 parts of chromium stearato-chloride in alcoholic solution, obtained according to Example 1, are added with agitation in the cold to 12.5 parts of copper 8-hydroxy-quinolate and 38 parts of chromic chloride hexahydrate. The mixture is brought to the boil and maintained under reflux until a clear mixture, free from insoluble material, is obtained; this requires about five hours. After cooling, a complex alcoholic solution is obtained which can be diluted with water without formation of a precipitate.

*Example 7*

149 parts of chromium stearato-chloride in alcoholic solution, obtained according to Example 1, are added in the cold with agitation to a mixture of 25 parts of copper 8-hydroxy-quinolate and 76 parts of chromic chloride hexahydrate. The mixture is brought to the boil. The copper 8-hydroxy-quinolate gradually dissolves and boiling is maintained until complete solution is obtained; this requires about five hours. After cooling, a solution comparable to that obtained in Example 6 above is obtained.

We claim:

1. A process for the preparation of an aqueous solution of copper 8-hydroxy-quinolate, which comprises dissolving this substance by heating in an alcoholic solution of a water-soluble complex of the Werner type in which the anion is monovalent and the cation contains trivalent chromium and an aliphatic carboxylic acid having from 6 to 22 carbon atoms, the alcohol of the said alcoholic solution having from 1 to 4 carbon atoms, the proportions being three molecules at most of copper 8- hydroxy-quinolate for each carboxylic group, then in diluting the solution thus obtained with water.

2. A process as claimed in claim 1 in which the complex is chromium stearatochloride.

3. The water-soluble solutions of copper 8-hydroxy-quinolate in alcoholic solutions of chromium stearatochloride which comprise up to three molecules of quinolate for each stearic group, the alcohol of the said alcoholic solutions having one to four carbon atoms.

References Cited in the file of this patent

UNITED STATES PATENTS

| | | |
|---|---|---|
| 2,273,040 | Iler | Feb. 17, 1942 |
| 2,346,755 | Hemming | Apr. 18, 1944 |
| 2,410,414 | Johnson | Nov. 5, 1946 |
| 2,648,614 | Martin et al. | Aug. 11, 1953 |
| 2,673,824 | Biefeld et al. | Mar. 30, 1954 |
| 2,744,835 | Caroselli | May 8, 1956 |